United States Patent
Owens et al.

(10) Patent No.: US 9,928,556 B2
(45) Date of Patent: Mar. 27, 2018

(54) CONTENT QUALITY EVALUATION AND CLASSIFICATION

(71) Applicant: Facebook, Inc., Menlo Park, CA (US)

(72) Inventors: Erich James Owens, Oakland, CA (US); David Vickrey, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 531 days.

(21) Appl. No.: 14/587,643

(22) Filed: Dec. 31, 2014

(65) Prior Publication Data
US 2016/0188600 A1    Jun. 30, 2016

(51) Int. Cl.
*G06F 17/30* (2006.01)
*G06Q 50/00* (2012.01)
*G06Q 30/02* (2012.01)

(52) U.S. Cl.
CPC ............. *G06Q 50/01* (2013.01); *G06Q 30/02* (2013.01)

(58) Field of Classification Search
CPC ........... G06F 17/30867; G06F 17/3053; G06F 17/3028
See application file for complete search history.

(56) References Cited

U.S. PATENT DOCUMENTS

| | | | | |
|---|---|---|---|---|
| 8,965,883 B2 * | 2/2015 | Si | ...................... | G06F 17/30864 |
| | | | | 707/723 |
| 9,043,417 B1 * | 5/2015 | Jones | .................. | H04L 63/1416 |
| | | | | 709/206 |
| 9,256,859 B2 * | 2/2016 | Olsen | ..................... | G06Q 50/01 |
| 9,264,418 B1 * | 2/2016 | Crosley | ................... | H04L 63/08 |
| 9,378,465 B2 * | 6/2016 | Stewart | ................ | G06N 99/005 |
| 9,378,529 B2 * | 6/2016 | Rubinstein | ........ | G06F 17/30867 |
| 9,454,781 B2 * | 9/2016 | Badenes | ............ | G06Q 30/0631 |
| 9,537,814 B2 * | 1/2017 | Rubinstein | .............. | H04L 51/32 |
| 9,712,331 B1 * | 7/2017 | Poh | ......................... | H04W 4/24 |
| 2008/0040474 A1 * | 2/2008 | Zuckerberg | ............ | G06Q 30/02 |
| | | | | 709/224 |
| 2011/0246907 A1 * | 10/2011 | Wang | ................. | G06Q 30/0224 |
| | | | | 715/751 |
| 2012/0150772 A1 * | 6/2012 | Paek | ...................... | G06N 5/025 |
| | | | | 706/12 |
| 2013/0031487 A1 * | 1/2013 | Olsen | ..................... | G06Q 50/01 |
| | | | | 715/751 |
| 2014/0172877 A1 * | 6/2014 | Rubinstein | ........ | G06F 17/30867 |
| | | | | 707/748 |
| 2014/0189539 A1 * | 7/2014 | St. Clair | ................. | G06F 3/048 |
| | | | | 715/753 |

* cited by examiner

*Primary Examiner* — Debbie Le
(74) *Attorney, Agent, or Firm* — Fenwick & West LLP (57) ABSTRACT

A social networking system classifies content items according to their qualities for ranking and selection of content items to present to users within, for example, a newsfeed. Low-quality content items that are unlikely to be interesting or relevant to a user may be distinguished though they may appear to be popular among users in the social networking system. The social networking system identifies within the content items one or more features that are indicators of the quality of the content items. The social networking system can use one or more classifiers to evaluate the content items based on the features, and it can compute a quality metric indicating the quality of a content item based on the result obtained from the classifiers. The quality metric can be used in the ranking and selection of a set of content items to provide to the user.

24 Claims, 4 Drawing Sheets

| | | Owner Value | |
|---|---|---|---|
| | | High | Low |
| Originality | High | 10 | 5 |
| | Low | 4 | 1 |

CONTENT QUALITY EVALUATION AND CLASSIFICATION

BACKGROUND

This invention relates generally to social networking, and more specifically to classify content items and thereby distinguish content items of different qualities.

Social networking systems allow users to connect and interact with each other. Users of social networking systems are typically interested in learning about actions performed by other users that are connected to the user in a social networking system. These actions may include photo uploads, status updates, transactions, wall or timeline posts, postings of comments, recommendations, likes indicated on content published by other users. Businesses, brands, groups, public figures, etc., can also post content on their pages. The posted content can then be provided to users following those pages. A user may be connected to many other users in a social networking system and a large number of stories reflecting actions taken by those other users or stories/posts from pages may be generated on a regular basis, any of which can be provided to the user on the social networking system in, for example, a newsfeed.

A user may have a preference for certain types stories compared to others, and there are certain stories that include higher-quality content than others. Presenting to each user stories that are more appealing to that user and are of higher-quality provides value to the social networking system in that it increases the chances of retaining the user, and encourages the user to be more engaged with the social networking system, and this in turn creates more business opportunities, such as advertising opportunities.

Nevertheless, it can be challenging to distinguish stores that are of value to a user from lower-quality stories, and to ensure that the user's newsfeed of stories continues over time to contain mostly high-quality stories. Lower-quality stories (e.g., spam content, meme content, and other junk-type content) are often specifically designed to encourage engagement by users. Thus, simply considering which stories have the highest engagement rate for the user and for other users may not be a sufficient way to determine what types of stories are actually the highest-quality stories for the user. Relying solely on past engagement rates may result in the user's newsfeed eventually being overrun by these lower-quality stories.

To encourage users' engagement in a social networking system, the user should be presented with high-quality stories that are of interest to the user. Each time there is an opportunity to present stories to a user, the social networking system will typically have a large collection of stories to choose from for that user. To select the best, highest-quality stories and to order them within the newsfeed, the social networking system uses a ranking algorithm to rank all of these story options for the user. Ranking that is primarily based on a user's past engagement with stories or predicted future engagement may promote low-quality content that a user does not wish to view since such low-quality content is often designed to increase its visibility in social networking systems. This low quality content may be disproportionately selected for inclusion in newsfeeds because of its high engagement rate among users, eventually resulting in this low quality content filling a majority of users' newsfeeds, which may frustrate users and cause users to be less engaged in social networking systems.

SUMMARY

A social networking system classifies content items according to their qualities for ranking and selection of content items to present to users within, for example, a newsfeed. Low-quality content items that are unlikely to be interesting or relevant to a user may be distinguished from higher-quality content items, even though the low-quality content items may appear to be popular among users in the social networking system based on measurements of user engagement therewith. Accordingly, content items that are likely to be over-valued by a ranking model that selects which stories to present to users based primarily on predicted user engagement may be adjusted to account for the quality of each story using a quality metric.

In computing this quality metric, the social networking system may identify features related to the quality of the content item. For example, features related to the originality of content (e.g., content posted by a user himself versus content posted by someone else that is shared by the user), the gaming nature of the content (e.g., stories designed to get users to engage with them, such as those that say "Like this if you agree with this post"), the quality of a hyperlink in the content (e.g., links to high quality articles and content rather than spam content), quality of other users' engagement (e.g., simply "liking" the content versus actually commenting on or more actively engaging with it), or the owner/source of or the page that posted a content item (e.g., a post may come from a high-quality page or a page that tends to provide spam content), among others, may be identified. One or more classifiers may be determined based on these various features identified. These classifiers are configured to describe whether the content is original, whether the content includes attempts to game a social networking system by encouraging users' engagement, whether the content is first published by a low-quality page or user, whether the content includes objects indicating Internet memes, etc.

The social networking system computes a quality metric for the content items based on the classifiers. For example, a score can be given to a content item that takes into account classifiers that describe that a content item was posted by a low quality page and includes feed gaming content (both classifiers indicating low quality), but is an original content item (a classifier indicating high quality). Machine learning techniques may be used to identify features, generate classifiers, and/or determine a quality metric for a content item. The content item may be further classified based on its quality. Content items may be classified into categories such as high-quality, medium-high-quality, medium-quality, medium-low-quality, low-quality, or the like, or by categories such as advertisement, meme, spam, unoriginal content, original content, gaming, or the like. Pages (e.g., business pages, brand pages, celebrity and other fan pages) that post content items or include posts of content items, where these content items can be provided in the newsfeed of users following those pages, can also be classified in the same manner (e.g., high or low quality page, fan page, meme page), and the quality of the pages can be used as one of the signals or features in classifying posts from those pages.

Content items may be ranked at least according to their qualities. Content items may be ranked higher or lower relative to other content items based on their qualities. The computation of this quality metric may be provided to another ranking model, such as a newsfeed ranking model, for the ranking and selection of these content items to present to a user in the newsfeed. For example, the quality metric may be used as one of multiple inputs to a content item ranking process that ranks and selects content items for a newsfeed, used in adjusting rankings or scores given to content items through a content item ranking process, used to determine where to place a content item in a newsfeed (e.g., if a content item is considered to be low quality or considered to look like an ad, this may affect where it is placed in a newsfeed), among other uses.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system computes a quality metric for one or more content items posted by users of the system. The quality metric for a content item is indicative of whether the content item is "junk" or spam-like in nature. The quality metric can be used as an input in the ranking of stories or posts or can be used to adjust newsfeed ranking scores upward or downward to reflect quality of the stories before they are selected for the newsfeed, thereby improving the quality of newsfeed content. The terms "stories," "posts," and "content items" are used interchangeably to refer to content that is posted by users or pages in a social networking system and provided to other users.

Social Networking System Architecture

Figure 1:
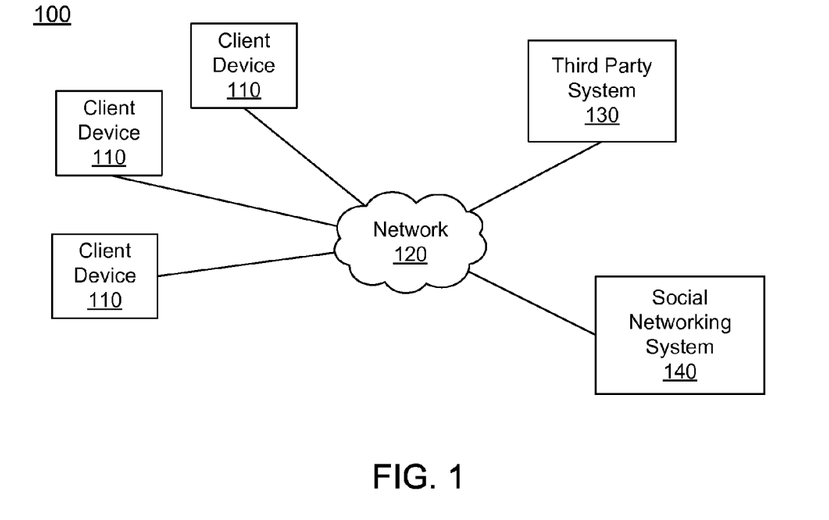
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
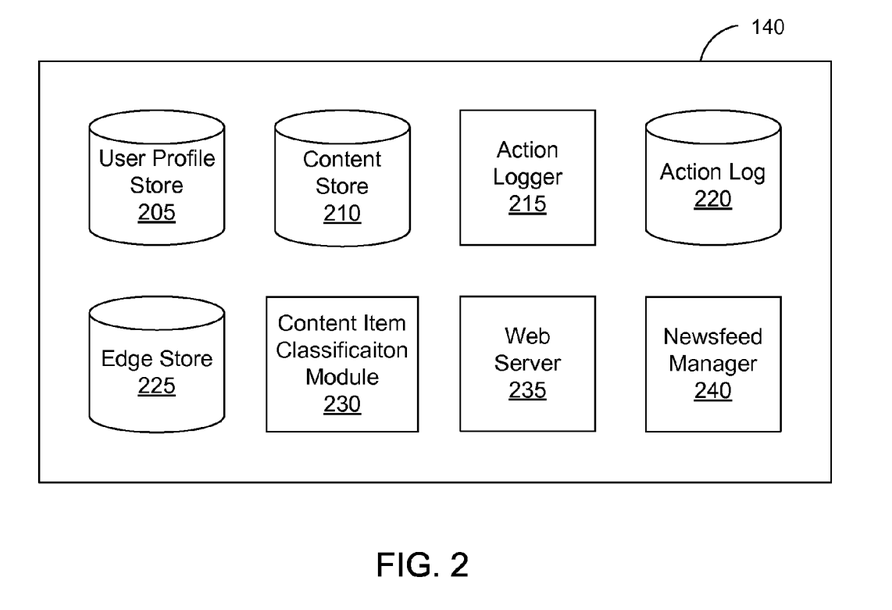
FIG. 2 is a block diagram of a social networking system, in accordance with an embodiment of the invention.

FIG. 2 is a block diagram of an architecture of the social networking system 140. The social networking system 140 shown in FIG. 2 includes a user profile store 205, a content store 210, an action logger 215, an action log 220, an edge store 225, a content item classification module 230, a web server 235, and a newsfeed manager 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content classification module 230 is described with reference to FIG. 3, which is a block diagram of one embodiment of the content item classification module 230. In the example shown by FIG. 3, the content item classification module 230 includes a feature identification module 305, a classifier determination module 310, and a quality evaluation module 315. The content item classification module 230 may evaluate and classify the nature and quality of content items. Content items may be presented to a user based on the evaluation and classification. The content item classification module 230 may compute a quality metric for each content item, which indicates the quality of the content item. The content item classification module 230 may provide the computed quality metrics to a content item ranking process, which selects one or more content items for presentation to a user. The content item ranking process receives the computed quality metric as one of various inputs and ranks the content items. Content items may be ranked and selected at least according to their qualities. As such, low-quality content items that are less likely to be interesting or relevant to a user may be distinguished. Such classification and selection of content items may be based on the information stored in the user profile store 205, the content store 210, the action log 220, and the edge store 225.

A content item may be a user's status update, a picture uploaded, a video shared, a link, a page post, an object, an event, shared by a user on one or more social networking systems (e.g., the social networking system 140), among other types of content items. Many different content items posted or shared by different users or by pages may be provided to a user such that the user receives a content feed or newsfeed of content items from his connections or from pages he is following within the social networking system. The content items may be selected for display to the user according to the user's interests, the affinity of the user for the owner of the content item (i.e., another user who shares the content item), the quality of the content item itself, among other factors.

The web server 235 links the social networking system 140 via the network 120 to the one or more client devices 110, as well as to the one or more third party systems 130. The web server 140 serves web pages, as well as other web-related content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

In one embodiment, the social networking system 140 identifies stories likely to be of interest to a user for a "newsfeed" presented to the user. This algorithm for identifying stories that is described here regarding FIG. 2 can include or be adjusted based on the quality metric that is described in more detail regarding FIG. 3. A story presented to a user describes an action taken by an additional user connected to the user and identifies the additional user, or may take a variety of other forms, including sponsored stories, advertisements, postings by a page associated with a business, entity, or person the user is following, among other story types. In some embodiments, a story describing an action performed by a user may be accessible to users not connected to the user that performed the action. The newsfeed manager 240 may generate stories for presentation to a user based on information in the action log 220 and in the edge store 225 or may select candidate stories included in content store 210. One or more of the candidate stories are selected and presented to a user by the newsfeed manager 240.

For example, the newsfeed manager 240 receives a request to present one or more stories to a social networking system user. The newsfeed manager 240 accesses one or more of the user profile store 105, the content store 110, the action log 120, and the edge store 130 to retrieve information about the identified user. For example, stories or other data associated with users connected to the identified user are retrieved. The retrieved stories or other data is analyzed by the newsfeed manager 240 to identify content likely to be relevant to the identified user. For example, stories associated with users or pages not connected to the identified user or stories associated with users or pages for which the identified user has less than a threshold affinity are discarded as candidate stories. Based on various criteria, the newsfeed manager 240 selects one or more of the candidate stories for presentation to the identified user.

In various embodiments, the newsfeed manager 240 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 240. The newsfeed manager 240 may also determine the order in which selected stories are presented via the newsfeed. For example, the newsfeed manager 240 determines that a user has a highest affinity for a specific user and increases the number of stories in the newsfeed associated with the specific user or modifies the positions in the newsfeed where stories associated with the specific user are presented.

The newsfeed manager 240 may also account for actions by a user indicating a preference for types of stories and selects stories having the same, or similar, types for inclusion in the newsfeed. As explained above, in some instances, this preference expressed by users, when expressed for low-quality stories, can result in the user being presented with more or mostly low-quality stories. The quality metric described below with regard to FIG. 3 can be used in the scoring of the stories to account for the quality of the story. Additionally, the newsfeed manager 240 may analyze stories received by social networking system 140 from various users and obtains information about user preferences or actions from the analyzed stories. This information may be used to refine subsequent selection of stories for newsfeeds presented to various users. This information can also be used in the classification of stories, as is described below.

Content Item Quality Evaluation and Classification System

Figure 3:
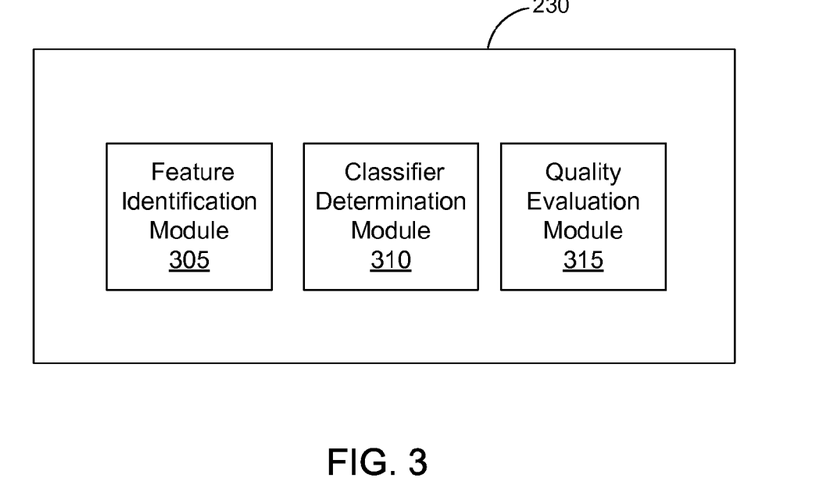
FIG. 3 is a block diagram of a content item classification module, in accordance with an embodiment of the invention.

FIG. 3 is a block diagram of a content item classification module 230, in accordance with an embodiment. As illustrated, the content item classification module 230 includes a feature identification module 305, a classifier determination module 310, and a quality evaluation module 315. The content item classification module 230 is configured to compute a quality metric associated with each content item or story that might be presented to a user. As explained above, each time a user logs onto to the social networking system or accesses a newsfeed associated with the social networking system, the social networking system determines what content items or stories to provide to that user. The newsfeed manager 240 scores and ranks the various content items that could be presented to the user. From this, the newsfeed manager 240 can select the top ranking content items to provide in the user's newsfeed and can determine how to order them in the newsfeed. However, to address the issue of newsfeed content quality degradation over time, the content item classification module 230 can compute a quality metric that can be used as one of various inputs for the newsfeed manager 240 in its newsfeed ranking model, can be used to adjust the scores generated by the newsfeed manager 240, can be used in determining placement of content items in the newsfeed, etc.

In some embodiments, in computing the quality metric, the content item classification module 230 classifies each content item based on the quality or the nature of the content item. The content item classification module 230 may distinguish content items of low quality from the rest of the content items. Content items that are low quality may be identified despite their popularity in social networking systems. A content item is considered popular when it has a high engagement rate and when is it is interacted with, such as by being commented on, shared, receiving indications of interest such as a "like," among other indications of interest. Each of the various content items or stories under consideration for presentation to a user may be classified before being presented to the user.

To compute the quality metric for each story or content item that is being considered for presentation to a user, the content items are analyzed to determine their features. The feature identification module 305 is configured to detect features related to the quality of a content item. Features related to the originality of a content item, the gaming nature of the item, other users' engagement with the item, the quality of a hyperlink included in the content item if there is one, the value of the owner (e.g., an individual, an entity, or a page) posting the content item, among other features, may be detected by the feature identification module 305. Each of these features is described in more detail below.

In some embodiments, the classifier determination module 310 determines or applies one or more classifiers based on the features identified by the feature identification module 305. For example, it might identify classifiers that classify content items according to their originality, gaming nature, the quality of other users' engagement, the link quality of a hyperlink, the value or quality of the owner posting the content item (e.g., a page that posted the content item), among other classifiers. These may be classifiers pre-trained to classify the content items according to these features. The feature identification module 305 is discussed in connection with the classifier determination module 310.

Features related to originality are one type of feature of content items that can be considered. The feature identification module 305 identifies features that may determine the originality of a content item. Whether a content item has been previously shared, the number of instances a content item has been shared in a social networking system, or whether a content item is mimicry, among others, may be identified. For example, the feature identification module 305 determines whether the content of a content item, such as an image in a content item can be found in a social networking system as one that has already been shared within the social networking system. The feature identification module 305 can analyze the content item to determine what content it contains, such as by doing an image analysis and determining if the pixels in the image are the same as the pixels in another image stored within the social networking system. If so, the content item is determined to be unoriginal since that image has likely already been shared within the system.

The feature identification module 305 may perform the image analysis by taking a hash or fingerprint of the image and comparing the hash or fingerprint of the image to hashes or fingerprints of images stored in the social networking system. Images that are previously posted in the social networking system and their fingerprints may be stored, for example, in a database. A match indicates that the image already exists in the social networking system and the image has been posted or shared before. Therefore, the content is not original.

In some embodiments, other mechanisms may be used to determine features related to originality, such as by looking at metadata (e.g., hashtag, audio fingerprint, image fingerprint, video fingerprint, facial recognition tag, or object recognition tag of the content. One or more hashtags, the identity of an individual, the identity of an object, or fingerprints associated with an image may be used to determine the originality of the image. For example, an image may be determined to include an object (e.g., Eiffel tower) and an individual (e.g., John Doe). The feature identification module 305 determines the identities of the object as well as the individual and queries the social networking system with Eiffel tower and John Doe to determine whether the image has been shared previously. The feature identification module 305 can also determine the number of occurrences of this image being shared in the social networking system.

For each content item, the classifier determination module 310 may determine a classifier classifying originality of the content item based on the features related to the originality of the content item, which are identified by the feature identification module 305. The originality of the content item may be described by using a classifier. The classifier may be configured to calculate the confidence of a content item being original. For example, the classifier determination module 310 may apply a classifier such that the more instances a content item can be found in the social networking system, the less original the content item is. The feature identification module 305 and the classifier determination module 310 may use machine learning techniques to identify features related to the originality of a content item and to determine a classifier describing the originality of the content item by using a trained machine. A machine may be trained by algorithms such as supervised learning, unsupervised learning, semi-supervised learning, developmental learning or the like. For example, a machine may be trained by supervised learning from labeled training data, which includes training examples having different degrees of originality (e.g., Internet memes, previously shared pictures with various numbers of instances that can be found in a social networking system, or posts that are newly published). The one or more features related to the originality of a content item identified may be provided as input to a classification algorithm (e.g., a classification function or a decision tree model), of which the output is a classifier. Original content that was newly created or posted by a user is considered to typically be of higher quality than unoriginal content that a user has simply shared, so the determination that content is unoriginal can be used to demote it or adjust its score downward in ranking of this content item for a user's newsfeed.

Features related to the feed gaming nature of a content item are another feature type that can be considered. The feature identification module 305 identifies features that may determine whether a content item is designed to demand insincere interest from users thereby increasing its chance of being distributed among users. For example, whether a content item includes text, whether a content item includes an overlay layer, whether the text includes gaming phrases, among others, may be identified. Content items game a social networking system by explicitly asking users to indicate interest and receive interactions or engagement from users, and thus appear to be popular in the social networking system. In some embodiments, the content of a content item may be identified and used to determine whether the content item is gaming nature. For example, text, images, videos, or audio of a content item may be evaluated to determine whether the content item includes feed gaming statements, such as "like this if you agree," "share this if you agree," or the like that explicitly solicits engagement from users. This type of feed gaming can appear in the text of the content item, but could also appear in, for example, an image of a soccer team holding up a sign that says "Like if you love soccer." Thus, the feature identification module 305 performs a text analysis of content items to identify these types of statements in the text, but also performs an analysis of images (e.g., optical character recognition) to detect these types of statements in images. Similar statements can be hidden in video, audio, etc., each of which can be analyzed.

For each content item, the classifier determination module 310 may determine a classifier classifying the gaming nature of the content item based on the features related to the gaming nature of the content item, which are identified by the feature identification module 305. The gaming nature of the content item may be described by using a classifier. The classifier may be configured to classify the confidence of the nature of a content item being gaming. For example, the classifier determination module 310 may apply a classifier such that the more explicitly a content item demands a user to indicate interest, the more likely that the content item is gaming.

The feature identification module 305 and the classifier determination module 310 may use machine learning techniques to identify features related to the gaming nature of a content item and to determine a classifier describing the gaming nature of the content item by using a trained machine. A machine may be trained by algorithms such as supervised learning, unsupervised learning, semi-supervised learning, developmental learning or the like. For example, a machine may be trained by supervised learning from labeled training data, which includes training examples with different ways of soliciting interest (e.g., an image with "Like this if you agree" underlined, an image with "Comment this if you agree" as an overlay layer, or an video of which a frame includes "Like and comment this if you agree" italicized). The one or more features related to the gaming nature of a content item identified may be provided as input to a classification algorithm (e.g., a classification function or a decision tree model), of which the output is a classifier. For content items that receive the same or similar interest in a social networking system, those that are not created to demand interest or solicit "likes" are considered to typically be of higher quality that those that are created to demand interest or solicit "likes," so the determination that the nature of a content item is gaming can be used to demote it or adjust its score downward in ranking of this content item for a user's newsfeed.

Features related to the quality of engagement by other users with a content item are another feature type that can be considered by the feature identification module 305. The feature identification module 305 may analyze other users' comments and/or sharing of a content item and identify attributes related to the quality of engagement by other users with a content item. For instance, the feature identification module 305 may determine the number of times the content item has been commented on or shared by other users, whether users make comments when liking or sharing the content item, or the average length of the comments. The more frequently a content item is commented on or shared by other users, the more comments a content item receives when being shared or liked, and the more extensive the comments are, the more genuine other users' engagement with the content item is. The feature identification module 305 may also determine the number of times a content item that is shared with other users includes a message from the sharer accompanying that share, since this indicates the sharer found the content item interesting enough to provide a message with sharing of the content item.

The feature identification module 305 may further determine the affinity between downstream users further interacting with a content item and the owner of the content item, which is another feature that may be analyzed. The closer the downstream users are with the owner or poster of the content item, the more genuine other users' engagement with the content item is. The owner of a content item is an individual or a page that originally shares or publishes the content item in a social networking system. For example, an individual that posts content or updates a status is the owner of the content or status update and a page that publishes a new post is the owner of the published post. The connection between the owner of the content and the one who is commenting on it is examined. If they are not directly connected or if there is a threshold distance (e.g., a secondary or tertiary connection) between them, the other users' engagement with the content item is considered to be of lower quality.

For each content item, the classifier determination module 310 may determine a classifier classifying other users' engagement with a content item based on the features related to the quality of other users' engagement with the content item, which are identified by the feature identification module 305. The quality of other users' engagement with a content item may be described by using a classifier. The classifier may be configured to classify the quality of other users' engagement. For example, the classifier determination module 310 may apply a classifier such that the more genuine other users are engaged with a content item, the higher quality other users' engagement is. The feature identification module 305 and the classifier determination module 310 may use machine learning techniques to identify features related to the quality of other users' engagement with a content item and to generate a classifier describing the quality of other users' engagement with the content item by using a trained machine.

A machine may be trained by algorithms such as supervised learning, unsupervised learning, semi-supervised learning, developmental learning or the like. For example, a machine may be trained by supervised learning from labeled training data, which includes training examples with different types of engagement (e.g., a follower of a page re-sharing a post without any comment, a non-follower of a page liking a post with a lengthy comment, an individual's status update liked and commented by the individual's friends, or an individual's image commented by users that are beyond third-degree of separation). The one or more features related to other users' engagement with a content item identified may be provided as input to a classification algorithm (e.g., a classification function or a decision tree model), of which the output is a classifier. Content that have more genuine engagement by other users are considered to typically be of higher quality that content that have less genuine engagement by other users, so the determination that content with which the engagement by other users is high quality can be used to promote it or adjust its score downward in ranking of this content item for a user's newsfeed.

Features related to the quality of hyperlinks included within the content item are another feature type that can be considered by the feature identification module 305. A hyperlink has low quality when the associated content item is designed to trick users into clicking through the link that directs users to spam content (e.g., ads or frequently circulated content). Frequently circulated content refers to the content of a content item that has been shared by multiple users and appears in multiple places in a social networking system. The feature identification module 305 may analyze users' engagement and/or feedback with a hyperlink and identify attributes related to the quality of engagement and/or feedback by other users. Other users' engagement and/or feedback with the content item accessed via the hyperlink may be analyzed to corroborate the nature of the link. For instance, the feature identification module 305 may analyze the ratio of users' clicks to indications of interest or "likes". The higher the ratio is, the more likely the content to which the link directs is spam. The feature identification module 305 may further analyze other users' engagement with a hyperlink compared to other hyperlinks in the same domain, the positive feedback rate for a hyperlink, the negative feedback rate for a hyperlink, the ratio of negative feedback rate to positive feedback rate, among others.

For each content item that includes a hyperlink, the classifier determination module 310 may determine a classifier classifying the quality of a hyperlink included based on the features related to the quality of the hyperlink, which are identified by the feature identification module 305. The nature of a hyperlink included in a content item may be described by using a classifier. For example, the classifier determination module 310 may apply a classifier such that the more likely the link directs to spam content, the lower quality the hyperlink is. The feature identification module 305 and the classifier determination module 310 may use machine learning techniques to identify features related to the quality of a hyperlink included in a content item and to generate a classifier describing the quality of the hyperlink by using a trained machine.

A machine may be trained by algorithms such as supervised learning, unsupervised learning, semi-supervised learning, developmental learning or the like. For example, a machine may be trained by supervised learning from labeled training data, which includes training examples with different types of hyperlinks (e.g., a page publishing a post including a hyperlink with high click rates and low like rates, a page publishing a post including a hyperlink with positive feedbacks such as "This is so cool," an individual re-sharing a post with a hyperlink with high click rates and with negative comments such as "I don't want to see this," or an individual's status update include liking a hyperlink with high click rates and without any comment). The one or more features related to the quality of a hyperlink included in a content item identified may be provided as input to a classification algorithm (e.g., a classification function or a decision tree model), of which the output is a classifier. For content items that include hyperlinks, content items that have a higher-quality hyperlink are considered to typically be of higher quality that content items that have a lower-quality hyperlink, so the determination of the quality of a hyperlink included in a content item can be used to promote it or adjust its score downward in ranking of this content item for a user's newsfeed.

Features related to the owner or the source of a content item are a further feature type that may be identified by the feature identification module 305. The feature identification module 305 may identify and analyze a user or a page that first publishes the content item or the content of the content item. Attributes related to the owner or the source of a content item may be identified and analyzed. Labels, if any, applied to a page that posted the content item may be accessed. For example, the feature identification module 305 may analyze whether the owner is a page or an individual, whether a page is authentic, whether a page is notable, whether a page is a fan page, whether a page is just for fun, whether a page is a junk page, if a page includes any hyperlink, the quality of the hyperlink included in a page, the content of a page, whether the page solicits interest from users, whether an individual is active, the number of friends an individual has, the number of interactions an individual has with friends, the number of pages an individual follows, how often an individual re-shares posts, the quality of the hyperlink shared by an individual, among others.

For each content item, the classifier determination module 310 may determine a classifier classifying the value of the owner of a content item based on the features related to the owner of the content item, which are identified by the feature identification module 305. A classifier may be determined to describe the quality of the owner of the content item. The quality of the owner is low when the owner publishes many low-quality content items or the owner is blocked by many users in the social networking system. For example, the classifier determination module 310 may be configured to apply a classifier such that the more low-quality items owned by a page, the lower the page's quality. The feature identification module 305 and the classifier determination module 310 may use machine learning techniques to identify features related to the owner of a content item and to generate a classifier describing the owner of a content item by using a trained machine.

A machine may be trained by algorithms such as supervised learning, unsupervised learning, semi-supervised learning, developmental learning or the like. For example, a machine may be trained by supervised learning from labeled training data, which includes training examples with owners of different values (e.g., an authentic page, a notable page, a fan page, a "just for fun" page, an individual who re-shares everything that he sees, or an individual who likes everything that is displayed to him). The one or more features related to the owner of a content item identified may be provided as input to a classification algorithm (e.g., a classification function or a decision tree model), of which the output is a classifier. Content items of which the owner is higher valued are considered to typically be of higher quality than content items of which the owner is lower valued, so the determination of the value of the owner of a content item can be used to promote it or adjust its score downward in ranking of this content item for a user's newsfeed.

The quality evaluation module 315 is configured to assess the quality of a content item by using the one or more classifiers determined by the classifier determination module 310. The quality evaluation module 315 may compute a quality metric evaluating the quality of a content item. In some embodiments, the quality metric is configured to include the classifiers determined by the classifier determination module 310. In some embodiments, the quality evaluation module 315 may determine a score for each classifier identified for a content item. The quality evaluation module 315 may be configured to value a content item with classifiers that suggest the content item has high quality. For example, the quality evaluation module may assign a higher score to classifiers that indicate the content item is more likely to be original, unlikely to be gaming, other users' engagement with a content item is high quality, a hyperlink is high quality, the owner or the source is high quality, among others.

Figure 4:
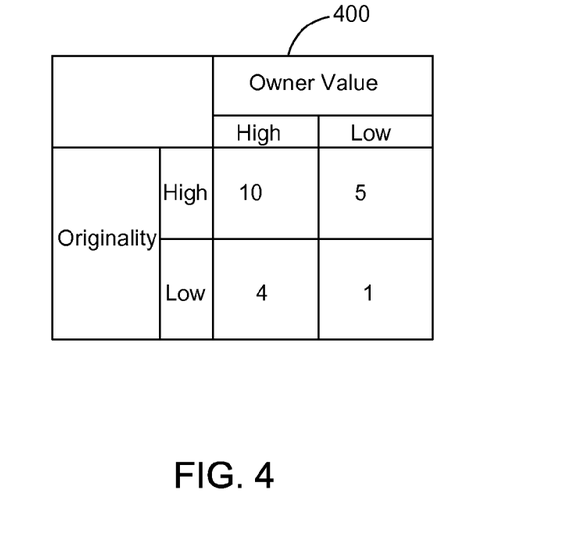
FIG. 4 illustrates an example table for determining a quality metric for a content item, in accordance with an embodiment of the invention.

The quality evaluation module 315 may also determine a score for a content item based on the determined classifiers and the score associated with each classifier. For example, as illustrated in FIG. 4, an example table 400 for determining a quality metric for a content item, which is a two-dimensional matrix including a classifier indicating the originality of a content item and a classifier indicating the owner of a content item. A content item that is determined to include classifiers indicating a high likelihood to be original and the owner is high value is assigned a credit of 10. A content item that is determined to include classifiers indicating a high likelihood to be original but the owner is high value is assigned a credit of 5. A content item that is determined to include classifiers indicating a low likelihood to be original and the owner is high value is assigned a credit of 4. A content item that is determined to include classifiers indicating a low likelihood to be original and the owner is low value is assigned a credit of 1. Quality metrics of higher dimensions including three or more classifiers may be constructed similarly to the two-dimensional quality metric.

The quality evaluation module 315 may use machine learning techniques to generate the quality metric measurement model. The quality metric measurement model may generate a classifier that takes as input all classifiers determined for a content item and outputs the quality metric for the content item. In this embodiment, the quality metric is a combined quality metric based on all of the various classifiers (e.g., feed gaming, originality, etc.). The quality metric measurement model may be configured to penalize content items that may suggest gaming nature, include unoriginal content or a low-quality hyperlink, or of which other users' engagement is superficial or the owner is low quality. The quality metric measurement model may be configured to promote content items that are not gaming, include original content or high-quality link, or of which other users' engagement is meaningful. The quality metric measurement model may be configured to evaluate the effect of each classifier has towards the quality metric for a content item. For example, for a post published by a page, the quality evaluation module 315 may determine that a classifier indicating the gaming nature may have a bigger effect on the quality of the post than a classifier indicating the originality of the post. In some embodiments, the quality evaluation module 315 may classify a content item as high-quality, medium-high-quality, medium-quality, medium-low-quality, low quality, or the like. In other embodiments, there may be a separate quality metric associated with each feature type that might be present in a content item (e.g., a feed gaming quality metric, an originality quality metric, etc.).

In some embodiments, the quality evaluation module 315 is configured to rank the content items received by the content item classification module 230 according to the quality metric determined for each content item. A content item having a higher quality metric may be ranked higher than another content item having a lower quality metric. The positions of content items with higher qualities may be adjusted higher relative to the positions of content items with lower qualities. For example, to a user, a picture taken and shared by the user's friend may be ranked higher than a marketing page liked by another friend of the user's but owned by a company. The quality evaluation module 315 values a content item as having a higher quality metric when receiving indications of interest from users. In some embodiments, each interest in a content item that includes classifiers indicating the content item is likely to be gaming receives less credit in the content item ranking process than it would receive otherwise. For example, for every indication of interest (e.g., like, share, or click on a link) received, the quality evaluation module 315 may assign different credits to a content item with different quality metric. For instance, the quality evaluation module 315 assigns 5 credits to a content item unlikely to be gaming nature for receiving each indication of interest whereas only 1 credit to a content item likely to be gaming nature. The quality evaluation module 315 limits the maximum credits a content item may receive when the content item includes a low-quality link.

The quality evaluation module 315 may generate a model based on optimization of different types of ranking models, including but not limited to algorithms that analyze every content item separately, pairs of content items, or sets of content items. For example, the quality evaluation module 315 may generate a classifier that takes as input a pair of content items received for a user and returns true if the first content item ranks higher than the second content item for having a higher quality. The quality evaluation module 315 may use the output of the determined classifier to rank a given set of content items by doing pair wise comparisons of the ranking scores of the content items. Other embodiments may use other machine learning techniques for ranking content items, for example, tree-based models, kernel methods, neural networks, splines, or an ensemble of one or more of these techniques.

In some embodiments, the quality evaluation module 315 is configured to provide the content items received along with the one or more respective quality metrics to the newsfeed manager 240. The newsfeed manager 240 may rank the content items based on many factors such as user preferences or the affinity between the user and the owner of the content item. The one or more quality metrics can be an additional input to the newsfeed manager 240 to use in ranking and selecting content items for a newsfeed for a user. In another embodiment, the one or more quality metrics can be applied after the newsfeed manager 240 has scored and ranked the content items as an additional factor that can either increase or decrease the scores based on quality. The one or more quality metrics can also be applied in determining placement of content items within a newsfeed. Certain locations in the newsfeed may be limited to certain types of content. For example, the newsfeed manager 240 may apply a rule that prevents the first position in the newsfeed from being filled with an advertisement or an "ad-like" content item. If the quality metric indicates that a content item is "ad-like," the newsfeed manager 240 may limit the locations in the newsfeed on which it may appear.

The newsfeed manager 240 may select a subset of content items for providing to a user based on their qualities among other factors. In one embodiment, the newsfeed manager 240 determines a threshold quality metric and selects the content items having quality metrics greater than the threshold quality metric. The newsfeed manager 240 may present the selected content items to the user in the order in which they are ranked.

Figure 5A:
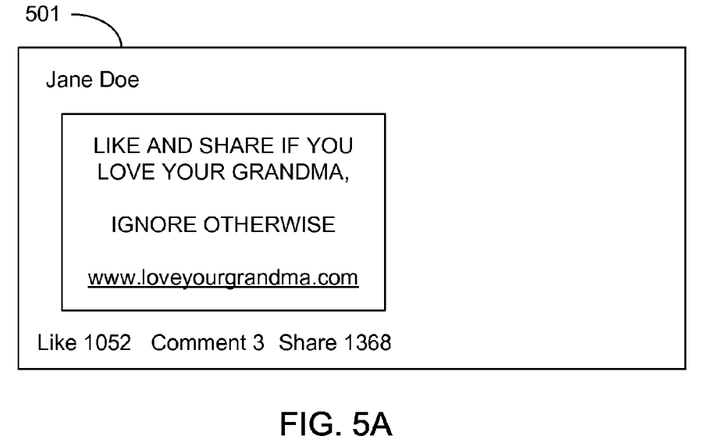
FIGS. 5A-5C illustrate examples of content items for which embodiments of the invention may be used to classify the content items.
Figure 5B:
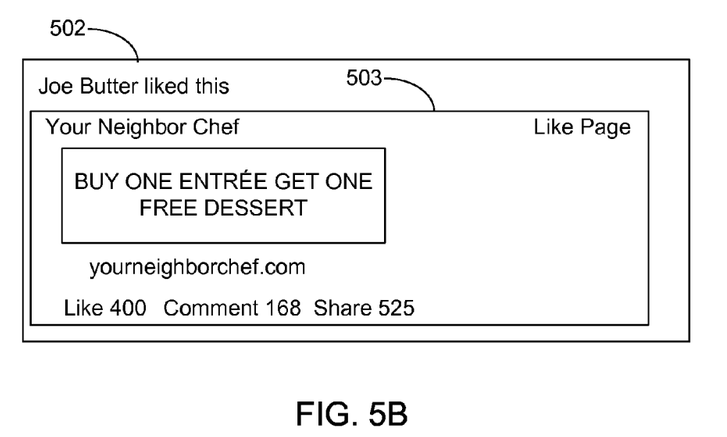
Figure 5C:
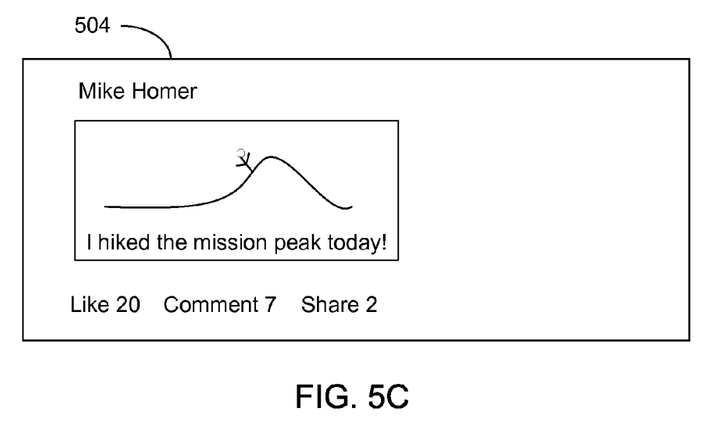

FIGS. 5A-5C illustrate examples of content items for which embodiments of the invention may be used to classify the content items. In the illustrated examples, content items 501, 502, and 504 are received by a content item classification module prior to being sent to a user. The quality of the content items 501, 502, and 504 is evaluated. The content item 501 is shared by Jane Doe, a friend of the user. The content item 501 includes languages asking a user to like or share if the user loves his or her grandma. Even though the content item 501 is popular since it has been liked 1052 times and shared 1368 times, the content item 501 is determined by the system to have a gaming nature because it demands interaction from a user. In addition, the content item 501 includes a hyperlink that directs a user to a website that contains only advertisements. Furthermore, other users' interaction with the content item 501 including other users' likes, shares, and comments on the content item 501, as well as the content of the comments, is analyzed. The content item 501 is also determined to be unoriginal because one or more fingerprints associated with the content item 501 have many matching instances in the social networking system. These features of the content item 501 may be identified. Classifiers determined for the content item 501 describe that it is likely to be feed gaming, has a low-quality hyperlink, has low-quality engagement by other users, includes unoriginal content, and the value of Jane Doe. In addition, a quality metric is computed for the content item 501 based on the classifiers that evaluate the content item. The content item 501 may be classified as low quality relative to other content items that might be selected for presentation to the user.

The content item 502 is shared by Joe Butter, another friend of the user, and includes a page 503 that is owned by Your Neighbor Chef. The content item 502 is unlikely to have a gaming nature because it does not include language or similar content that demands interaction from users. In addition, the content item 502 includes a link that directs the user to the Your Neighbor Chef's homepage. Furthermore, other users' interaction with the content item 502, including other users' likes, shares, comments on the content item 502, the content of the comments, and the affinity between Joe Butter and the page 503 is analyzed. The content item 502 is also determined to be unoriginal because one or more fingerprints associated with the content item 501 have many matching instances in the social networking system. These features of the content item 502 may be identified. Classifiers applied to this content item describe that the content item 502 is unlikely to be feed gaming, include a medium-quality hyperlink, has medium-quality engagement by other users, and includes unoriginal content. The value or quality of the page 503 as indicated by a page classifier may also be considered. The quality metric for the content item 502 indicates it is likely to be medium-low-value/quality for the user.

The content item 504 is shared by Mike Homer, another friend of the user, and it includes a picture uploaded by Mike Homer with caption. The content item 504 is unlikely to have a gaming nature because it does not include languages or similar content that demands interaction from users. In addition, no link was found in the content item 504. Furthermore, other users' interaction with the content item 504 including other users' likes, shares, and comments on the content item 504, as well as the content of the comments, is analyzed. The content item 504 is also determined to be original because one or more fingerprints associated with the content item 501 have no matching instances in the social networking system. These features of the content item 504 may be identified. Classifiers applied to the content item 504 describe that the content item 504 is unlikely to be feed gaming, has high-quality engagement by other users, and includes original content. The quality metric for the content item 504 indicates it is likely to be high quality or high value to the user.

Content Item Quality Evaluation and Classification Method

Figure 6:
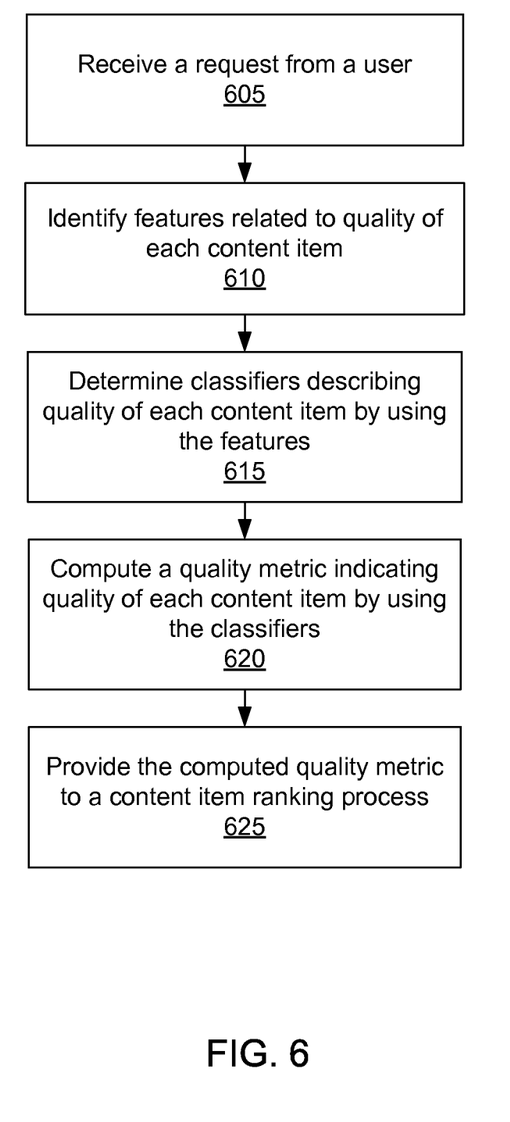
FIG. 6 is a flow chart of a method for evaluating and classifying content items based on their quality, in accordance with an embodiment of the invention.

FIG. 6 is a flow chart of one embodiment of method for evaluating and classifying content items based on their quality, in accordance with an embodiment. In various embodiments, the steps described in conjunction with FIG. 6 may be performed in different orders. Additionally, different and/or additional steps than those described in conjunction with FIG. 6 may be performed in some embodiments.

At block 605, a request is received from a user in a social networking system for a plurality of content items to be presented to the user. For example, the request occurs when a user refreshes his or her newsfeed or logs into the social networking system. All the content items that are shared with the user are identified as candidate content items. The system evaluates the quality of each candidate content item for the user. One or more candidate content items may be selected as content items for presentation to the user.

At block 610, one or more features related to the quality of a candidate content item may be identified. For example, features related to originality, gaming nature, engagement of other users, the quality of a hyperlink, or the owner or the source of a content item may be identified. Features may be identified according to the discussion provided above. In various embodiments, features are identified by machine learning algorithms. A trained machine is provided to identify features related to the quality of a candidate content item. A machine may be trained by supervised learning from labeled training data, which includes training examples having different degrees of originality, including different patterns soliciting interest, including different types of engagement from other users, including hyperlinks of different qualities, or having owners of different values.

At block 615, one or more classifiers describing the quality of a candidate content item may be determined based on the features identified at step 610. For each candidate content item, one or more classifiers may be determined to indicate the confidence of its content being original, of having a gaming nature, the quality of engagement by other users, the quality of a hyperlink, or the value of the owner. The classifiers may be determined by using machine learning techniques. Features identified at block 610 may be provided to the trained machine which outputs one or more classifiers for a candidate content item. The classifiers can be used to demote or promote a candidate content item relative to other candidate content items or adjust its score downward in ranking of this content item for a user's newsfeed.

At block 620, a quality metric may be computed based on the classifiers determined at block 615. The quality metric indicate the quality of each candidate content item. A quality metric may be one or more dimensional. For each content item, the quality metric may be computed by using machine learning techniques. A quality metric measurement model may be generated by a trained machine that takes as input all classifiers determined for a content item and outputs the quality metric for the content item. The quality metric measurement model is configured to penalize content items that may suggest gaming nature, include unoriginal content or a low-quality hyperlink, or of which other users' engagement is superficial or the owner is low quality. The quality metric measurement model may also evaluate the effect of each classifier has towards the quality metric for a content item.

At block 625, the quality metric computed for the candidate content items may be provided to a content item ranking process. The content item ranking process may select one or more content items from the candidate content items for presentation to the user. In some embodiments, a candidate content item may have an initial ranking for the user relative to other candidate content items, and the content item ranking process adjusts the initial ranking of the candidate content items relative to others to account for the quality of the content items according to the quality metrics. Content items may be ranked higher or lower relative to other content items based on their qualities. A content item having a higher quality metric may be ranked higher than another content item having a lower quality metric. In some embodiments, a candidate content item may having a ranking relative to other candidate content items that effects whether the candidate content item may be selected for presentation to the user. Content items with higher qualities may be adjusted higher relative to the positions of content items with lower qualities. As such, content items with higher qualities are more likely to be selected for presentation to a user than content items with lower qualities.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    receiving a request for a plurality of content items to be presented to a user of a social networking system, the user connected to a plurality of other users in the social networking system;
    for each of a set of candidate content items for the user:
        identifying one or more features of the candidate content item, the one or more features related to a quality of the candidate content item,
        determining one or more classifiers based on the one or more features identified, the one or more classifiers describing the quality of the candidate content item, and
        computing a quality metric for the candidate content item based on the one or more classifiers, the quality metric indicating the quality of the candidate content item relative to other candidate content items of the set and indicating a likelihood that the candidate content item is junk or spam; and
    providing the computed quality metric for each of the candidate content items of the set to a content item ranking process to select the plurality of content items to present to the user.

2. The computer-implemented method of claim 1, further comprising:
    accessing the set of candidate content items for the user in response to the request, each of the candidate content items having an initial ranking for the user relative to other candidate content items that affects whether the candidate content item is selected for presentation to the user,
wherein providing the computed quality metric for each of the candidate content items of the set to the content item ranking process further comprises adjusting the initial ranking of each of the candidate content items to account for the quality of the content items according to the quality metric for each of the candidate content items of the set.

3. The computer-implemented method of claim 2, further comprising:
selecting from the set of candidate content items the plurality of content items to present to the user in a newsfeed based on the adjusted rankings of the candidate content items.

4. The computer-implemented method of claim 1, wherein providing the computed quality metric for each of the candidate content item of the set to the content item ranking process further comprises including the computed quality metric as one of multiple inputs into the content item ranking process for ranking the candidate content items and selecting from the ranked candidate content items the plurality of content items to present to the user in a newsfeed.

5. The computer-implemented method of claim 1, wherein the one or more classifiers comprise classifiers for the candidate content item based on originality of the candidate content item, gaming nature of the candidate content item, engagement of other users with the candidate content item, a quality of a hyperlink in the candidate content item, or an owner of the candidate content item.

6. The computer-implemented method of claim 1, wherein identifying one or more features of the candidate content item comprises determining originality of the candidate content item, the determination comprising comparing a fingerprint of content of the candidate content item to fingerprints of content of previously posted content items in the social networking system, wherein a match with one of the fingerprints of content of previously posted content items indicates that the content of the candidate content item exists in the social networking system.

7. The computer-implemented method of claim 6, wherein a classifier of the one or more classifiers is determined based on a number of instances the content of the candidate content item found in the social networking system, and wherein the quality metric is applied in the content item ranking process to decrease a ranking of the candidate content item relative to other candidate content items of the set.

8. The computer-implemented method of claim 1, wherein identifying one or more features of the candidate content item comprises evaluating whether the content of the candidate content item solicits interest from the user.

9. The computer-implemented method of claim 8, wherein a classifier of the one or more classifiers is determined based on an explicitness with which the content item solicits interest, and wherein the quality metric is applied in the content item ranking process to assign less credit to each interest in the candidate content item than otherwise would be given.

10. The computer-implemented method of claim 2, wherein identifying one or more features of the candidate content item comprises identifying features relating to a quality of engagement of other users with the content item based on a number of shares of or comments on the candidate content item, whether the candidate content item included a message with a share of the candidate content item, an average length of a message included with a share or in a comment on the candidate content item, or an average length of comments on the candidate content item, or an affinity of users who interacted with the candidate content item for a user who posted the content candidate content item.

11. The computer-implemented method of claim 2, wherein identifying one or more features of the candidate content item comprises identifying features relating to a link quality of a hyperlink included in the candidate content item based on a ratio of clicks on or selections of the hyperlink by users to indications of interest or likes of the hyperlink by users, a higher ratio indicating a lower link quality, and wherein the quality metric is computed such that the candidate content item receives less credit in the content item ranking process than otherwise would be for clicks on or selections of the hyperlink.

12. The computer-implemented method of claim 2, wherein identifying one or more features of the candidate content item comprises accessing a label applied to a page that posted the candidate content item, the label indicating a quality of the page, and wherein the quality of the page is included in the quality metric for the quality of the candidate content item posted by that page.

13. A computer program product comprising a non-transitory computer-readable storage medium containing computer program code for:
receiving a request for a plurality of content items to be presented to a user of a social networking system, the user connected to a plurality of other users in the social networking system;
for each of a set of candidate content items for the user:
identifying one or more features of the candidate content item, the one or more features related to a quality of the candidate content item,
determining one or more classifiers based on the one or more features identified, the one or more classifiers describing the quality of the candidate content item, and
computing a quality metric for the candidate content item based on the one or more classifiers, the quality metric indicating the quality of the candidate content item relative to other candidate content items of the set and indicating a likelihood that the candidate content item is junk or spam; and
providing the computed quality metric for each of the candidate content items of the set to a content item ranking process to select the plurality of content items to present to the user.

14. The computer program product of claim 13, where the computer-readable storage medium further contains computer program code for:
accessing the set of candidate content items for the user in response to the request, each of the candidate content items having an initial ranking for the user relative to other candidate content items that affects whether the candidate content item is selected for presentation to the user, wherein providing the computed quality metric for each of the candidate content items of the set to the content item ranking process further comprises adjusting the initial ranking of each of the candidate content items to account for the quality of the content items according to the quality metric for each of the candidate content items of the set.

15. The computer program product of claim 14, where the computer-readable storage medium further contains computer program code for:

selecting from the set of candidate content items the plurality of content items to present to the user in a newsfeed based on the adjusted rankings of the candidate content items.

16. The computer program product of claim 13, wherein providing the computed quality metric for each of the candidate content item of the set to the content item ranking process further comprises including the computed quality metric as one of multiple inputs into the content item ranking process for ranking the candidate content items and selecting from the ranked candidate content items the plurality of content items to present to the user in a newsfeed.

17. The computer program product of claim 13, wherein the one or more classifiers comprise classifiers for the candidate content item based on originality of the candidate content item, gaming nature of the candidate content item, engagement of other users with the candidate content item, a quality of a hyperlink in the candidate content item, or an owner of the candidate content item.

18. The computer program product of claim 13, wherein identifying one or more features of the candidate content item comprises determining originality of the candidate content item, the determination comprising comparing a fingerprint of content of the candidate content item to fingerprints of content of previously posted content items in the social networking system, wherein a match with one of the fingerprints of content of previously posted content items indicates that the content of the candidate content item exists in the social networking system.

19. The computer program product of claim 18, wherein a classifier of the one or more classifiers is determined based on a number of instances the content of the candidate content item found in the social networking system, and wherein the quality metric is applied in the content item ranking process to decrease a ranking of the candidate content item relative to other candidate content items of the set.

20. The computer program product of claim 13, wherein identifying one or more features of the candidate content item comprises identifying features indicating a gaming nature of the candidate content item based on an evaluation of content included in the candidate content item for a solicitation from the user for interest in the candidate content item.

21. The computer program product of claim 13, wherein the quality metric is computed such that each interest in the candidate content item receives less credit in the content item ranking process than otherwise would be given.

22. The computer program product of claim 13, wherein identifying one or more features of the candidate content item comprises identifying features relating to a quality of engagement of other users with the content item based on a number of shares of or comments on the candidate content item, whether the candidate content item included a message with a share of the candidate content item, an average length of a message included with a share or in a comment on the candidate content item, or an average length of comments on the candidate content item, or an affinity of users who interacted with the candidate content item for a user who posted the content candidate content item.

23. The computer program product of claim 13, wherein identifying one or more features of the candidate content item comprises identifying features relating to a link quality of a hyperlink included in the candidate content item based on a ratio of clicks on or selections of the hyperlink by users to indications of interest or likes of the hyperlink by users, a higher ratio indicating a lower link quality, and wherein the quality metric is computed such that the candidate content item receives less credit in the content item ranking process than otherwise would be for clicks on or selections of the hyperlink.

24. The computer program product of claim 13, wherein identifying one or more features of the candidate content item comprises accessing a label applied to a page that posted the candidate content item, the label indicating a quality of the page, and wherein the quality of the page is included in the quality metric for the quality of the candidate content item posted by that page.

* * * * *

UNITED STATES PATENT AND TRADEMARK OFFICE
CERTIFICATE OF CORRECTION

PATENT NO. : 9,928,556 B2
APPLICATION NO. : 14/587643
DATED : March 27, 2018
INVENTOR(S) : Erich James Owens et al.

It is certified that error appears in the above-identified patent and that said Letters Patent is hereby corrected as shown below:

In the Claims

Column 23, Line 35, after "content item" insert -- is --.

Signed and Sealed this
Twelfth Day of March, 2019

Andrei Iancu
*Director of the United States Patent and Trademark Office*